Oct. 28, 1952  P. F. KOCH  2,615,343
COMBINED CLUTCH AND PULLEY
Filed Dec. 1, 1951
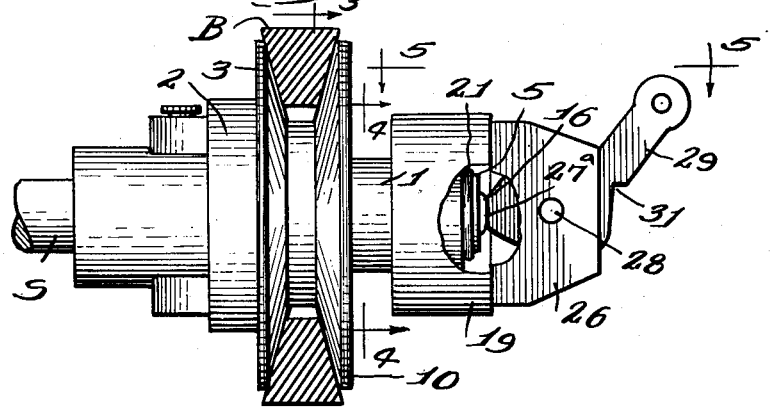
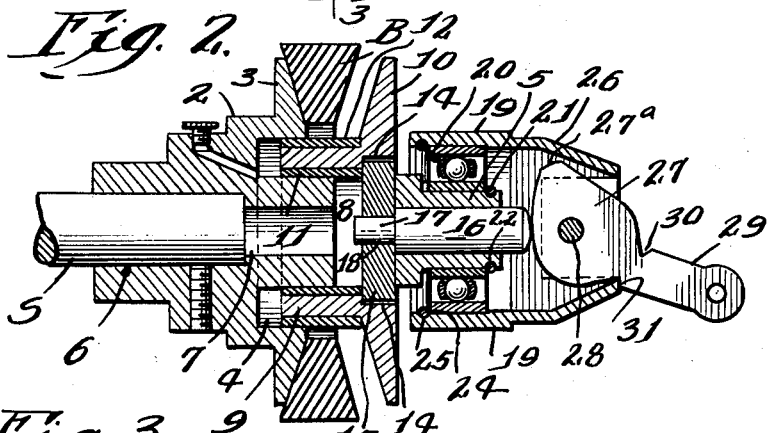
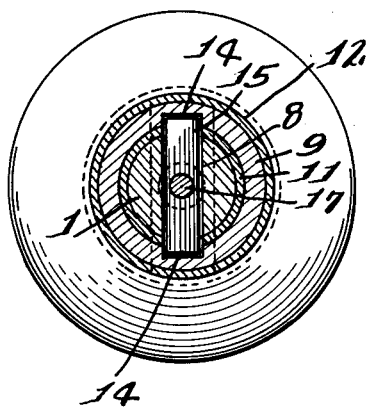
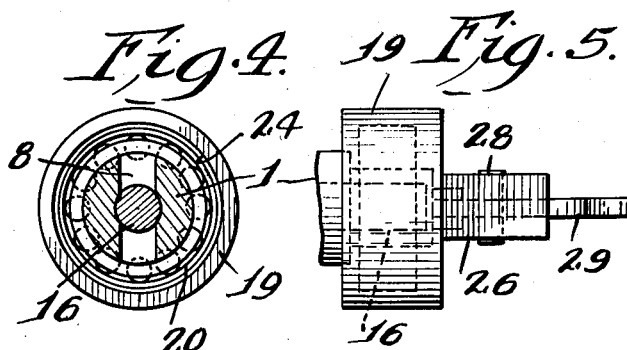
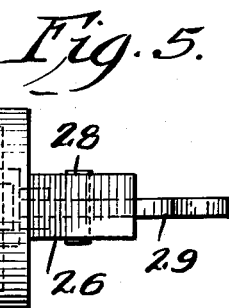
Inventor.
Paul F. Koch,
By Wm F. Freudenreich
Attorney.

Patented Oct. 28, 1952

2,615,343

UNITED STATES PATENT OFFICE 2,615,343

COMBINED CLUTCH AND PULLEY

Paul F. Koch, Chicago, Ill., assignor to Chicago Die Casting Manufacturing Company, a corporation of Illinois Application December 1, 1951, Serial No. 259,374

5 Claims. (Cl. 74—230.24)

In my prior application, Ser. No. 204,113, filed January 3, 1951, now Patent 2,594,450, dated April 29, 1952, I have disclosed and claimed a device in which a pulley and a clutch are combined. The present invention has for its object to simplify said device and substantially reduce the cost of manufacture, without lessening its utility or efficiency.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figure 1 is a side elevation of my improved device, showing in section, a belt in tractive relation therewith; Fig. 2 is an axial section through said device, in unclutching or belt-releasing condition; Fig. 3 is a section on line 3—3 of Fig. 1; Fig. 4 is a section on line 4—4 of Fig. 1; and Fig. 5 is an elevational view of a fragment of such device, viewed from line 5—5 in Fig. 1.

The device, as in the aforesaid application, is based on a pulley, separated into two parts, movable relatively to each other, in the axial direction, to grip a belt for driving effort or release it when no work is to be done.

One of these two main parts of the pulley consists of a long tubular member 1. One end 2 of this member is enlarged to form a hub for a pulley flange 3 and is cut away to form a deep, wide, annular groove 4 surrounded by the flange. That part of member 1 extending from the plane of the bottom of the groove to the other end of said member is of uniform diameter except that a short section 5, at the extreme end, is of lesser diameter. The section 6 of the bore at the hub end of said member is larger in diameter than the remainder 7 of the bore; this larger section being adapted to receive a shaft S on which the device is to be mounted. Member 1 contains a long, wide, slot 8 extending diametrically through the same a short distance from flange 3.

The second part of the pulley is a thick sleeve 9 slidable upon the central portion of member 1 and having at one end an external, annular flange 10 for cooperation with flange 3 to form an annular channel to receive a belt B. Antifriction bushings 11 and 12 are arranged, respectively, within and around sleeve 9. The parts are so proportioned that the bushed sleeve fits slidably into groove 4. Sleeve 9 has in its flanged end face a pair of diametrically opposed notches 14, 14 opening out radially from the bore in the sleeve.

Extending through slot 8 in member 1 is a rectangular bar or key 15, the ends of which are loosely seated in the notches 14. While this key is in place, the two parts of the pulley are tied together against separation; but they may move relatively to each other in the axial direction to grip a belt, as in Fig. 1, or to release it, as in Fig. 2.

Sleeve 9, with its flange 10, may be moved into and locked in its working position by a plunger 16 that is positioned in bore 7 outwardly from and in contact with bar or key 15. The plunger has at its inner end an axial projection or pin 17 that is a sliding fit in a hole 18 through the middle of the key; this pin serving to center the key.

Surrounding the small end section 5 of member 1 is a cylindrical cup-shaped casing 19, considerably larger in internal diameter than element 5. This provides an annular space, between element 5 and the surrounding cylindrical wall of the casing, for the reception of a ball bearing unit 20. This unit is a pressed fit on element 5; a divided spring-ring 21 being snapped into a groove 22 in element 5 outwardly from the bearing unit to assist in holding the unit in place.

The ball bearing unit is also a pressed fit in the casing; and a second divided, spring ring 24, snapped into a groove 25 within the open end of the casing, aids in preventing separation of said unit from the casing.

Casing 19 has an axial extension 26 from the part that forms the bottom of the cup; this extension being a sleeve-like element, rectangular in cross section, opening at one end into the interior of the casing proper; and one transverse dimension being about equal to the diameter of the cup, while the other transverse dimension is hardly one third as great.

Within the pocket thus formed in part 26 is a flat cam 27, held in place by a transverse pin 28, the axis of which is at right angles to and lies in a plane containing the axis of the pulley and the plunger. The cam is provided with a handle or operating lever 29 protruding from the outer end of member 26; the cam and the lever lying in the same plane. At the juncture of the lever and the cam are two notches, 30 and 31, one in each edge of the flat cam device. The high point of the cam is a straight or slightly concave edge section 27ª so disposed that, when the lever is swung up until the edge of the top wall of cam-housing member 26 is seated in notch 30, the axis of the plunger intersects the flat cam section at right angles; this condition being illustrated in Fig. 1. When the lever is swung down until the edge of the lower wall of housing 26 is seated in notch 31, as in Fig. 2, the axis of the plunger intersects the edge of the cam at the low point.

The parts are so proportioned that the plunger at all times protrudes beyond the end of the tubular part within which it slides. Therefore, when lever 29 is swung up the cam exerts a holding pressure against the plunger to lock the pulley in belt gripping condition. When the control lever is swung down, with the edge of the lower wall of member 26 engaged in notch 31, as in Fig. 2, the pulley is free to expand, but the cam still serves as a stop, namely a stop to limit the relative spreading movements of the two pulley flanges.

It will be seen that pin 17 on the inner end of the plunger is long enough to prevent the key or bar 15 from sliding off the same, even when the plunger is in contact with the low point of the cam; and it therefore serves a dual purpose.

The device is used in the same manner as my said prior device, but is easier to assemble.

To assemble the parts, sleeve 9, with its flange 10, is slipped onto member 1, key or bar 15 is inserted in slot 8 and, upon entering the plunger in the tubular member, the key is centered and kept from dropping out. Then the ball bearing unit is pressed onto part 5 and holding ring 6 is added. Then ring 24 is slipped on between the bearing unit and flange 10, the casing is pressed onto the bearing unit, and ring 24 is snapped into place within the casing.

Before the cup-shaped casing is applied, however, the cam device is secured within the same. Because of the special shape of the flat cam and lever unit, no attention need be paid as to which cam housing edge enters which notch. The cam element is simply picked up and pushed into the housing; either notch being able to perform the functions of the other.

The novel features of the present invention not only make assembly easier than in the case of prior devices, but also constitute structural changes in the latter which substantially lower the cost of manufacture and create a sturdier mechanism.

While I have illustrated and described with particularity only a single preferred form of my invention, I do not desire to be limited to the exact details thus illustrated and described, but intend to cover all forms and arrangements that come within the definition of my invention constituting the appended claims.

I claim:

1. A pulley and clutch mechanism comprising a pulley divided into two members transversely of the pulley axis, one member having thereon an axial, tubular element extending through and being a sliding fit in the second member, said tubular element containing a slot extending diametrically through the same, a loose cross bar, the dimension of which in the direction of the length of said members is less than the corresponding dimension of the slot, extending through said slot and interlocked at its ends with said second member to hold the latter against rotary movements relatively to the other member, a casing rotatable on the outer end of the tubular element, a plunger slidable in the tubular element and engaged at its inner end with said bar, a cam means in the casing to force the plunger inward or allow it to move outward, said bar having at the middle a hole smaller in diameter than the plunger, and a projection on the inner end of the plunger fitting slidably in said hole, said projection being long enough to remain in said hole when the plunger is at the outer limit of its movements.

2. A pulley and clutch mechanism comprising a pulley divided into two members transversely of the pulley axis, one member having thereon an axial, tubular element extending through and being a sliding fit in the second member, said tubular element containing a slot extending diametrically through the same, a loose cross bar, the dimension of which in the direction of the length of said members is less than the corresponding dimension of the slot, extending through said slot and interlocked at its ends with said second member to hold it against rotary movements relatively to the other member, a ball bearing unit having a pressed fit on the outer end of the tubular element, the latter containing an annular groove beside the outer face of said unit, a ring sprung into the aforesaid groove and protruding therefrom, a cup-shaped casing embracing the outer end of the tubular element and said ball bearing unit, said casing containing an annular, internal groove between said ball bearing unit and the rim of the cup, a ring sprung into the latter groove and protruding therefrom, a plunger slidable in the tubular element and engaged at its inner end with said bar, and a cam means in the casing to force the plunger inward or allow it to move outward.

3. A pulley and clutch mechanism comprising a V pulley divided into two members transversely of the pulley axis, one of said members being provided with an axial, tubular element extending slidably through the second of said members, means connecting said second member and the tubular element together to prevent relative rotary movements and permit relative movements lengthwise of the tubular element, a ball bearing unit secured on the outer end of the tubular element, a casing in the form of a cup embracing and fixed to said unit, a pusher means for said second member including a plunger slidable in the tubular element and having its outer end exposed in the casing, the bottom of the cup being formed with an outward projection containing a deep, narrow pocket registering with the plunger, a cam housed in said pocket for rocking movements in a plane containing the axis of the pulley for engagement with the outer end of the plunger to move it in the direction to force the second pulley member into belt-driving relation to the other pulley member, said pocket containing an axial opening outwardly from the cam, and the cam being provided with an extension protruding through the latter opening and constituting an operating lever for the cam.

4. A pulley and clutch mechanism comprising a pulley divided into two members transversely of the pulley axis, one of said members being provided with an axial, tubular element extending slidably through the second of said members, means connecting said second member and the tubular element together to prevent relative rotary movements and permit relative movements lengthwise of the tubular element, a ball bearing unit pressed on the outer end of the tubular element, a casing in the form of a cup embracing and pressed on said unit, a pusher means for said second member including a plunger slidable in the tubular element and having a rounded outer end exposed in the casing, the bottom of the cup being formed with an outward projection containing a deep, narrow pocket registering with the plunger, a flat cam mounted in said pocket for rocking movements in a plane containing the axis of the pulley for engagement at its edge with the rounded end of the plunger to move it in the direction to move the second pulley member into belt-driving relation to the other pulley member, said pocket containing an axial opening outwardly from the cam, and the cam being provided with an extension in the plane thereof protruding through the latter opening and constituting an operating lever for the cam.

5. A pulley and chute mechanism as set forth in claim 4, wherein the tubular element is provided with a circumferential groove beside the outer face of the ball bearing unit and the cup contains a similar internal groove beside the inner face of said unit, and wherein each groove contains a divided spring ring that overlaps the adjacent face of the ball bearing unit.

PAUL F. KOCH.

REFERENCES CITED

The following references are of record in the file of this patent:

UNITED STATES PATENTS

| Number | Name | Date |
|---|---|---|
| 2,144,443 | Thomas | Jan. 17, 1939 |
| 2,259,149 | Cederstrom | Oct. 14, 1941 |
| 2,594,450 | Koch | Apr. 29, 1952 |